(12) United States Patent
Kiser et al.

(10) Patent No.: US 10,536,612 B2
(45) Date of Patent: *Jan. 14, 2020

(54) COLOR MATCHING ACROSS MULTIPLE SENSORS IN AN OPTICAL SYSTEM

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,285

(22) Filed: Feb. 1, 2019

(65) Prior Publication Data

US 2019/0166283 A1    May 30, 2019

Related U.S. Application Data

(63) Continuation of application No. 15/914,329, filed on Mar. 7, 2018, now Pat. No. 10,200,569, which is a
(Continued)

(51) Int. Cl.
*G06T 5/00* (2006.01)
*H04N 1/60* (2006.01)
(Continued)

(52) U.S. Cl.
CPC ....... *H04N 1/6027* (2013.01); *G02B 27/1013* (2013.01); *G06T 5/002* (2013.01);
(Continued)

(58) Field of Classification Search
CPC .. H04N 1/6027; H04N 1/00068; H04N 1/603; H04N 5/2258; H04N 5/2355;
(Continued)

(56) References Cited

U.S. PATENT DOCUMENTS 2,560,351 A    7/1951  Kell
2,642,487 A    6/1953  Schroeder
(Continued)

FOREIGN PATENT DOCUMENTS

CN    101344706 B    9/2010
EP    0484802 A2     5/1992
(Continued)

OTHER PUBLICATIONS

Abstract of JP 2000019407 A (2 pages).
(Continued)

*Primary Examiner* — Sean T Motsinger
(74) *Attorney, Agent, or Firm* — Brown Rudnick LLP; Thomas C. Meyers

(57) ABSTRACT

Matching color information in an optical system can include splitting an image forming beam into a bright intensity beam and a dark intensity beam, detecting, using multiple sensors, a color value for a light component from the bright intensity beam and the dark intensity beam, determining color values for the remaining light components associated with the bright intensity beam and the dark intensity beam, and transforming the color values associated with the dark intensity beam to calibrate the color values of the dark intensity beam against the color values of the light intensity beam, the color values of the light intensity beam including color inaccuracies.

11 Claims, 6 Drawing Sheets

Related U.S. Application Data continuation of application No. 15/427,767, filed on Feb. 8, 2017, now Pat. No. 9,948,829.

(60) Provisional application No. 62/294,820, filed on Feb. 12, 2016.

(51) Int. Cl.

| | | |
|---|---|---|
| *H04N 1/00* | (2006.01) | |
| *G06T 11/60* | (2006.01) | |
| *G02B 27/10* | (2006.01) | |
| *H04N 9/67* | (2006.01) | |
| *H04N 17/00* | (2006.01) | |
| *G06T 7/90* | (2017.01) | |
| *H04N 5/225* | (2006.01) | |
| *H04N 5/235* | (2006.01) | |
| *H04N 5/265* | (2006.01) | |
| *H04N 9/09* | (2006.01) | |
| *H04N 9/64* | (2006.01) | |
| *H04N 21/2343* | (2011.01) | |
| *H04N 21/2365* | (2011.01) | |

(52) U.S. Cl.
CPC ............... *G06T 7/90* (2017.01); *G06T 11/60* (2013.01); *H04N 1/00068* (2013.01); *H04N 1/603* (2013.01); *H04N 5/2258* (2013.01); *H04N 5/2355* (2013.01); *H04N 5/265* (2013.01); *H04N 9/09* (2013.01); *H04N 9/646* (2013.01); *H04N 9/67* (2013.01); *H04N 17/002* (2013.01); *H04N 21/2365* (2013.01); *H04N 21/23439* (2013.01); *G06T 2207/10024* (2013.01); *G06T 2207/10144* (2013.01); *G06T 2207/20208* (2013.01); *G06T 2207/20221* (2013.01)

(58) Field of Classification Search
CPC .......... H04N 5/265; H04N 9/09; H04N 9/646; H04N 9/67; H04N 17/002; H04N 21/23439; H04N 21/2365; G06T 7/90; G06T 5/002; G06T 2207/10024; G06T 2207/10144; G06T 2207/20208; G06T 2207/20221; G02B 27/1013

See application file for complete search history.

(56) References Cited

U.S. PATENT DOCUMENTS

| | | | |
|---|---|---|---|
| 2,971,051 A | 2/1961 | Back | |
| 3,202,039 A | 8/1965 | DeLang | |
| 3,381,084 A | 4/1968 | Wheeler | |
| 3,474,451 A | 10/1969 | Abel | |
| 3,601,480 A | 8/1971 | Randall | |
| 3,653,748 A | 4/1972 | Athey | |
| 3,659,918 A | 5/1972 | Tan | |
| 3,668,304 A | 6/1972 | Ellenberger | |
| 3,720,146 A | 3/1973 | Yost, Jr. | |
| 3,802,763 A | 4/1974 | Cook et al. | |
| 3,945,034 A | 3/1976 | Suzuki | |
| 4,009,941 A | 3/1977 | Verdijk et al. | |
| 4,072,405 A | 2/1978 | Ozeki | |
| 4,084,180 A | 4/1978 | Stoffels et al. | |
| 4,134,683 A | 1/1979 | Goetz et al. | |
| 4,268,119 A | 5/1981 | Hartmann | |
| 4,395,234 A | 7/1983 | Shenker | |
| 4,396,188 A | 8/1983 | Dreissigacker et al. | |
| 4,486,069 A | 12/1984 | Neil et al. | |
| 4,555,163 A | 11/1985 | Wagner | |
| 4,584,606 A | 4/1986 | Nagasaki | |
| 4,743,011 A | 5/1988 | Coffey | |
| 4,786,813 A | 11/1988 | Svanberg et al. | |
| 4,805,037 A | 2/1989 | Noble et al. | |
| 4,916,529 A | 4/1990 | Yamamoto et al. | |
| 4,933,751 A | 6/1990 | Shinonaga et al. | |
| 5,024,530 A | 6/1991 | Mende | |
| 5,092,581 A | 3/1992 | Koz | |
| 5,093,563 A | 3/1992 | Small et al. | |
| 5,134,468 A | 7/1992 | Ohmuro | |
| 5,153,621 A | 10/1992 | Vogeley | |
| 5,155,623 A | 10/1992 | Miller et al. | |
| 5,194,959 A | 3/1993 | Kaneko et al. | |
| 5,272,518 A | 12/1993 | Vincent | |
| 5,386,316 A | 1/1995 | Cook | |
| 5,642,191 A | 6/1997 | Mende | |
| 5,707,322 A | 1/1998 | Dreissigacker et al. | |
| 5,729,011 A | 3/1998 | Sekiguchi | |
| 5,734,507 A | 3/1998 | Harvey | |
| 5,801,773 A | 9/1998 | Ikeda | |
| 5,835,278 A | 11/1998 | Rubin et al. | |
| 5,856,466 A | 1/1999 | Cook et al. | |
| 5,900,942 A | 5/1999 | Spiering | |
| 5,905,490 A | 5/1999 | Shu et al. | |
| 5,926,283 A | 7/1999 | Hopkins | |
| 5,929,908 A | 7/1999 | Takahashi et al. | |
| 6,011,876 A | 1/2000 | Kishner | |
| 6,215,597 B1 | 4/2001 | Duncan et al. | |
| 6,392,687 B1 | 5/2002 | Driscoll, Jr. et al. | |
| 6,646,716 B1 | 11/2003 | Ramanujan et al. | |
| 6,674,487 B1 | 1/2004 | Smith | |
| 6,747,694 B1* | 6/2004 | Nishikawa | H04N 5/235 |
| | | | 348/223.1 |
| 6,801,719 B1 | 10/2004 | Szajewski et al. | |
| 6,856,466 B2 | 2/2005 | Tocci | |
| 7,068,890 B2 | 6/2006 | Soskind et al. | |
| 7,084,905 B1 | 8/2006 | Nayar et al. | |
| 7,138,619 B1 | 11/2006 | Ferrante et al. | |
| 7,177,085 B2 | 2/2007 | Tocci et al. | |
| 7,283,307 B2 | 10/2007 | Couture et al. | |
| 7,336,299 B2 | 2/2008 | Kostrzewski et al. | |
| 7,397,509 B2 | 7/2008 | Krymski | |
| 7,405,882 B2 | 7/2008 | Uchiyama et al. | |
| 7,714,998 B2 | 5/2010 | Furman et al. | |
| 7,719,674 B2 | 5/2010 | Furman et al. | |
| 7,731,637 B2 | 6/2010 | D'Eredita | |
| 7,961,398 B2 | 6/2011 | Tocci | |
| 8,035,711 B2 | 10/2011 | Liu et al. | |
| 8,320,047 B2* | 11/2012 | Tocci | G02B 5/04 |
| | | | 359/629 |
| 8,340,442 B1 | 12/2012 | Rasche | |
| 8,441,732 B2* | 5/2013 | Tocci | G02B 5/04 |
| | | | 359/629 |
| 8,619,368 B2* | 12/2013 | Tocci | G02B 5/04 |
| | | | 359/629 |
| 8,622,876 B2 | 1/2014 | Kelliher | |
| 8,659,683 B1* | 2/2014 | Linzer | H04N 5/21 |
| | | | 348/222.1 |
| 8,982,962 B2 | 3/2015 | Alshin et al. | |
| 9,087,229 B2 | 7/2015 | Nguyen et al. | |
| 9,129,445 B2 | 9/2015 | Mai | |
| 9,131,150 B1 | 9/2015 | Mangiat et al. | |
| 9,277,122 B1 | 3/2016 | Imura et al. | |
| 9,560,339 B2 | 1/2017 | Borowski | |
| 9,661,245 B2 | 5/2017 | Kawano | |
| 9,675,236 B2* | 6/2017 | McDowall | A61B 1/00009 |
| 9,948,829 B2 | 4/2018 | Kiser | |
| 9,955,084 B1 | 4/2018 | Haynold | |
| 9,974,996 B2 | 5/2018 | Kiser | |
| 2002/0014577 A1* | 2/2002 | Ulrich | G01B 11/2513 |
| | | | 250/205 |
| 2002/0089765 A1 | 7/2002 | Nalwa | |
| 2003/0007254 A1 | 1/2003 | Tocci | |
| 2003/0016334 A1 | 1/2003 | Weber | |
| 2003/0048493 A1* | 3/2003 | Pontifex | H04N 5/243 |
| | | | 358/514 |
| 2003/0072011 A1 | 4/2003 | Shirley | |
| 2004/0119020 A1 | 6/2004 | Bodkin | |
| 2004/0125228 A1 | 7/2004 | Dougherty | |
| 2004/0179834 A1* | 9/2004 | Szajewski | G02B 3/0056 |
| | | | 396/333 |
| 2005/0001983 A1 | 1/2005 | Weber | |

(56) References Cited

U.S. PATENT DOCUMENTS

| | | |
|---|---|---|
| 2005/0041113 A1 | 2/2005 | Nayar et al. |
| 2005/0099504 A1 | 5/2005 | Nayar et al. |
| 2005/0117799 A1 | 6/2005 | Fuh et al. |
| 2005/0151860 A1* | 7/2005 | Silverstein ............ H04N 9/045 348/272 |
| 2005/0157943 A1 | 7/2005 | Ruggiero |
| 2005/0168578 A1 | 8/2005 | Gobush |
| 2005/0212827 A1 | 9/2005 | Goertzen |
| 2005/0219659 A1 | 10/2005 | Quan |
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0249652 A1 | 11/2006 | Schleifer |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong et al. |
| 2007/0189758 A1* | 8/2007 | Iwasaki ............... G03B 7/08 396/234 |
| 2007/0201560 A1 | 8/2007 | Segall et al. |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0055683 A1* | 3/2008 | Choe ................... H04N 1/387 358/525 |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0175496 A1 | 7/2008 | Segall |
| 2008/0198235 A1 | 8/2008 | Chen et al. |
| 2008/0198266 A1 | 8/2008 | Kurane |
| 2008/0297460 A1 | 12/2008 | Peng et al. |
| 2009/0059048 A1 | 3/2009 | Luo et al. |
| 2009/0213225 A1 | 8/2009 | Jin et al. |
| 2009/0225433 A1 | 9/2009 | Tocci |
| 2009/0244717 A1 | 10/2009 | Tocci |
| 2009/0290043 A1 | 11/2009 | Liu et al. |
| 2010/0201799 A1* | 8/2010 | Mohrholz ............. A61B 3/12 348/78 |
| 2010/0225783 A1* | 9/2010 | Wagner ............... H04N 5/2254 348/229.1 |
| 2010/0271512 A1 | 10/2010 | Garten |
| 2010/0328780 A1* | 12/2010 | Tocci ................... G02B 5/04 359/636 |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0179833 A1 | 7/2012 | Kenrick et al. |
| 2012/0212964 A1 | 8/2012 | Chang et al. |
| 2012/0241867 A1 | 9/2012 | Ono et al. |
| 2012/0242867 A1 | 9/2012 | Shuster |
| 2012/0299940 A1 | 11/2012 | Dietrich, Jr. et al. |
| 2013/0021505 A1 | 1/2013 | Plowman et al. |
| 2013/0063300 A1 | 3/2013 | O'Regan et al. |
| 2013/0093805 A1* | 4/2013 | Iversen ................. H04N 9/31 345/690 |
| 2013/0094705 A1 | 4/2013 | Tyagi et al. |
| 2013/0194675 A1 | 8/2013 | Tocci |
| 2013/0250113 A1 | 9/2013 | Bechtel et al. |
| 2013/0286451 A1 | 10/2013 | Verhaegh |
| 2013/0329053 A1* | 12/2013 | Jones ................... H04N 9/735 348/164 |
| 2014/0002694 A1 | 1/2014 | Levy et al. |
| 2014/0063300 A1* | 3/2014 | Lin ...................... H04N 9/045 348/277 |
| 2014/0085422 A1* | 3/2014 | Aronsson ............. G06T 5/50 348/46 |
| 2014/0132946 A1 | 5/2014 | Sebastian et al. |
| 2014/0152694 A1* | 6/2014 | Narasimha ........... G09G 5/377 345/629 |
| 2014/0168486 A1 | 6/2014 | Geiss |
| 2014/0198187 A1* | 7/2014 | Lukk ................... H04N 13/24 13/243 |
| 2014/0210847 A1 | 7/2014 | Knibbeler et al. |
| 2014/0263950 A1 | 9/2014 | Fenigstein et al. |
| 2014/0313369 A1* | 10/2014 | Kageyama ........... G06T 11/001 348/223.1 |
| 2015/0201222 A1 | 7/2015 | Mertens |
| 2015/0208024 A1 | 7/2015 | Takahashi et al. |
| 2015/0296140 A1 | 10/2015 | Kim |
| 2015/0302562 A1 | 10/2015 | Zhai et al. |
| 2015/0312498 A1 | 10/2015 | Kawano |
| 2015/0312536 A1 | 10/2015 | Butler et al. |
| 2016/0050354 A1 | 2/2016 | Musatenko et al. |
| 2016/0057333 A1* | 2/2016 | Liu ...................... H04N 5/2355 348/239 |
| 2016/0163356 A1 | 6/2016 | De Haan et al. |
| 2016/0173811 A1 | 6/2016 | Oh et al. |
| 2016/0205368 A1 | 7/2016 | Wallace et al. |
| 2016/0323518 A1* | 11/2016 | Rivard ................. H04N 5/247 |
| 2016/0345032 A1 | 11/2016 | Tsukagoshi |
| 2016/0353123 A1 | 12/2016 | Ninan |
| 2016/0360212 A1 | 12/2016 | Dai et al. |
| 2016/0375297 A1 | 12/2016 | Kiser |
| 2017/0006273 A1 | 1/2017 | Borer et al. |
| 2017/0070719 A1 | 3/2017 | Smolic et al. |
| 2017/0126977 A1 | 5/2017 | Tan et al. |
| 2017/0155818 A1 | 6/2017 | Bonnet |
| 2017/0155873 A1 | 6/2017 | Nguyen |
| 2017/0237879 A1 | 8/2017 | Kiser et al. |
| 2017/0237890 A1 | 8/2017 | Kiser et al. |
| 2017/0237913 A1 | 8/2017 | Kiser et al. |
| 2017/0238029 A1* | 8/2017 | Kiser ................... H04N 5/2355 725/146 |
| 2017/0279530 A1 | 9/2017 | Tsukagoshi |
| 2018/0048801 A1 | 2/2018 | Kiser et al. |
| 2018/0198957 A1 | 7/2018 | Kiser et al. |

FOREIGN PATENT DOCUMENTS

| | | |
|---|---|---|
| EP | 1225574 A2 | 7/2002 |
| EP | 1395062 A1 | 3/2004 |
| GB | 2526047 A | 11/2015 |
| GB | 2539917 A | 1/2017 |
| JP | S53093026 A | 8/1978 |
| JP | S53124028 A | 10/1978 |
| JP | S60213178 A | 10/1985 |
| JP | S63160489 A | 7/1988 |
| JP | H0468876 A | 3/1992 |
| JP | H0564070 A | 3/1993 |
| JP | H06335006 A | 12/1994 |
| JP | H07107346 A | 4/1995 |
| JP | H11127441 A | 5/1999 |
| JP | 2000019407 A | 1/2000 |
| JP | 2000338313 A | 12/2000 |
| JP | 2001136434 A | 5/2001 |
| JP | 2002165108 A | 6/2002 |
| JP | 2003035881 A | 2/2003 |
| JP | 2007295326 A | 11/2007 |
| WO | 2005025685 A1 | 3/2005 |
| WO | 2009/111642 A1 | 9/2009 |
| WO | 2009/121068 A2 | 10/2009 |
| WO | 2011/032028 A2 | 3/2011 |
| WO | 2012/076646 A1 | 6/2012 |
| WO | 2015/072754 A1 | 5/2015 |
| WO | 2015/173570 A1 | 11/2015 |
| WO | 2017/157845 A1 | 9/2017 |

OTHER PUBLICATIONS

Abstract of JP 2003035881 A (2 pages).
Abstract of JP S60213178 A (2 pages).

(56) References Cited

OTHER PUBLICATIONS

Aggarwal, 2004, Split Aperture Imaging for High Dynamic Range, Int J Comp Vis 58(1):7-17.
Alleysson, 2006, HDR CFA Image Rendering, Proc EURASIP 14th European Signal Processing Conf.
Banterle, 2009, High dynamic range imaging and low dynamic range expansion for generating HDR content, Eurographics State of the the Art Report (18 pages).
Borer, 2014, Non-linear opto-electrical transfer functions for high dynamic range television, Research and Development White Paper, British Broadcasting Corporation (24 pages).
Bravo, 2011, Efficient smart CMOS camera based on FPGAs oriented to embedded image processing, Sensors 11:2282-2303.
Debevec, 1997, Recovering High Dynamic Range Radiance Maps from Photographs, Int Conf Comp Graphics and Interactive Techniques, proceedings.
Flux Data Inc, 2008, FD-1665 High Resolution 3 CCD Multispectral Industrial Camera, web.archive.orgweb20080113023949www.fluxdata.com/prod (7 pages).
International Search Report and Written Opinion dated Apr. 14, 2017, for PCT/US17/17396 filed Feb. 10, 2017 (9 pages).
International Search Report and Written Opinion dated Apr. 28, 2017, for PCT/US17/17405, filed Feb. 10, 2017 (9 pages).
International Search Report and Written Opinion dated May 2, 2017, for PCT/US17/16991, filed Feb. 8, 2017 (7 pages).
International Search Report and Written Opinion dated May 8, 2017, for PCT/US17/17400 filed Feb. 10, 2017 (8 pages).
International Search Report and Written Opinion dated Oct. 23, 2017, for International application No. PCT/US17/45683, with International filed Aug. 7, 2017 (5 pages).
International Search Report and Written Opinion dated Sep. 20, 2018, for International Application No. PCT/US2018/041034 (10 pages).
Kao, 2008, High Dynamic Range Imaging by Fusing Multiple Raw Images and Tone Reproduction, IEEE Transactions on Consumer Electronics 54(1):10-15.
Lukac 2004, Demosaicked Image Postprocessing Using Local Color Ratios, IEEE Transactions on Circuits and Systems for Video Technology 14(6):914-920.
Lyu, 2014, A 12-bit high-speed column parallel two-step single-slope analog-to-digital converter (ADC) for CMOS image sensors, Sensors 14:21603-21625.
Machine translation of CN 101344706 B, generated on May 19, 2017, by espacenet (11 pages).
Machine translation of JP 2000019407 A generated on May 30, 2017, by EPO website (52 pages).
Machine translation of JP 2000338313 A generated on Dec. 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 A genertaed on May 30, 2017, by EPO website (19 pages).
Machine translation of JP 2007295326 A generated on Dec. 21, 2016, by the European Patent Office website Espacent (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP S53093026 A, issued as JP S599888, generated on Dec. 21, 2016 (5 pages).
Machine translation of JP S60213178 A generated on May 30, 2017, by EPO website (6 pages).
Myszkowki, 2008, High Dynamic Range Video, Morgan & Claypool Publishers, San Rafael, CA (158 pages).
Nayar, 2000, High dynamic range imaging: spatially varying pixel exposures, 2000 Proc IEEE Conf on Comp Vision and Pattern Rec, ISSN: 1063-6919.
Rahman, 2011, Pipeline synthesis and optimization of FPGA-based video processing applications with CAL, EURASIP J Image Vid Processing 19:1-28.
Schulte, 2016, HDR Demystified: Emerging UHDTV systems, SpectraCal 1-22.
Sony, 2017, HDR (High Dynamic Range), Sony Corporation (16 pages).
Stumpfel, 2004, Direct HDR Capture of the Sun and Sky, Computer graphics, virtual reality, visualisation and Interaction in Africa (9 pages).
Tiwari, 2015, A review on high-dynamic range imaging with its technique, Int J Sig Proc, IPPR 8(9):93-100.
Tocci, 2011, A versatile HDR video production system, ACM Transactions on Graphics (TOG)—Proceedings of ACM SIG-GRAPH 2011, 30(4):article 41.
Touze, 2014, HDR video coding based on local LDR quantization, Second International Conference and SME Workshop on HDR imaging.

\* cited by examiner

COLOR MATCHING ACROSS MULTIPLE SENSORS IN AN OPTICAL SYSTEM

CROSS-REFERENCE TO RELATED APPLICATIONS

This application is a continuation of Ser. No. 15/914,329, filed Mar. 7, 2018, and now issued as U.S. Pat. No. 10,200,569, which application is a continuation of U.S. application Ser. No. 15/427,767, filed Feb. 8, 2017, and now issued as U.S. Pat. No. 9,948,829, which application claims the benefit of U.S. Application No. 62/294,820, filed on Feb. 12, 2016, the contents of which are incorporated by reference.

TECHNICAL FIELD

This disclosure relates to color matching across multiple sensors in an optical system.

BACKGROUND

A human visual system is capable of identifying and processing visual features with high dynamic range. For example, real-world images that have contrast ratios of 1,000,000:1 or greater can be accurately processed by the human visual cortex. However, most image acquisition devices are only capable of reproducing or capturing low dynamic range, resulting in a loss of image accuracy. The problem is ever more significant in video imaging.

There are numerous examples of creating high dynamic range images by post processing images from multiple sensors, each subject to different exposures. The resulting "blended" image is intended to capture a broader dynamic range than would be possible from a single sensor without a post-processing operation.

Typical color sensors have a color filter array (CFA) incorporated with the sensor. In a CFA sensor, each pixel has one of three color filters placed in front of it: Red, Green, or Blue. As is well-understood in the field of color sensor implementation, the raw image produced by a CFA sensor thus has a characteristic Bayer pattern. In a process that is well-understood in the field of color sensor implementation, such Bayer pattern images from color sensors are typically demosaiced to give each pixel three unique values: a Red (R) value, a Green (G) value, and a Blue (G) value. The demosaiced image is then typically color corrected (CC) to match the values of true colors in the real world (so-called "truth" or "true" color values). The CC process is well-understood in the field of color sensor implementation. The CC process entails first capturing a Bayer image of a calibrated color-square card, demosaicing this image, and then calculating a Color Correction Matrix (CCM). The CCM is stored in the camera's memory, and is then automatically multiplied by each pixel's RGB values in subsequent images, in order to correct subsequent images from the color corrected space (CCS) of the sensor to CCS of "truth".

In a typical HDR merging process, multiple CC images are combined together to create an HDR image.

An implicit assumption in all previous HDR merging methods is that the CCM of all sensors is identical.

Despite their presence in the dynamic range, the resulting images still fail to reproduce the robust natural color of their subjects. One significant problem with traditional attempts to improve dynamic range is the inability to replicate colors which are often diluted or exaggerated as a result of traditional image processing. There is a need, therefore, for improved image processing techniques as exemplified by the following disclosure.

SUMMARY

In an optical system, merging information from multiple sensors improves the dynamic range of image capture. Methods of the invention generate a true color image by sequentially converting data from a first sensor into the color correction space of a second sensor, combining image data from the first and second sensor, and then optionally converting the combined data into the color correction space of a third sensor and combining the previously-combined image data with the image data from the third sensor, and so forth for n sensors, where n is any integer number greater than one. Ultimately, the combined color data are color-corrected to generate a true color image file that is reflective of the dynamic range of the imaged object. The stepwise data conversion from multiple sensors (typically starting with the sensor receiving the least amount of light) corrects for differences in the amount of light received by sensors at different locations in the optical path used to produce an image. The image information from multiple sensors having been "equalized", the resulting combination of information from all sensors accurately conveys light levels and color values of the original object being imaged.

The present invention improves on previous HDR merging methods, by converting one sensor's data from its CCS to the CCS of another sensor (the color matching step), before merging the images from the two sensors. The merged image data can then be converted to the CCS of a third sensor, before being combined with the image data from that third sensor. The process may be repeated for as many sensors as desired. After all sensors' images have been combined, the final combined image may be demosaiced and then may be color corrected to truth.

The purpose of the color matching step in the present invention is to correct for any differences in light spectrum between light that reflects and light that transmits through the optical system's various beamsplitters. Although such beamsplitters may be called "spectrally neutral", there are often slight wavelength-dependent differences in the amount of light transmitted. These differences can cause the amounts (and/or ratios) of R, G, and B colors sensed by the various sensors, for a single color of input light, to be different.

Methods described herein are also useful to correct for the variation in the detected color levels among different sensors that is caused by the position of the sensor relative to a beam splitter (e.g., glass cubes or pellicles). Beamsplitters typically include a partially reflective surface (e.g., a thin film coating). As a light beam either reflects from or transmits through a beamsplitter, properties of the light beam (e.g., transmittance or reflection) are affected. As a light beam travels through multiple beamsplitters, the effects increase exponentially. In a multiple sensor optical system, combining color information without accounting for these effects will prevent the system from capturing a true color HDR image. By transforming all of the detected color information into the corrected color space of a single sensor, color data are readily combinable to produce a true color image. In addition, the described methods are also not affected by variations in the reflective coating due to, for example, lot to lot variations or chemical reformulations.

In addition, methods described herein facilitate color matching the various sensors' arrays to each other without excessive processing time because, at least in part, the color matching process is based on pixel information rather than frame information. Because color matching processes of the invention do not require information for a complete frame, they can be integrated into a real time HDR pipeline. In other words, color matching processes of the invention are compatible with an HDR optical system that processes pixel level information independent of overall frame information. In addition, the methods described herein are compatible with hardware already used in HDR image or video systems, so no additional hardware is required.

These and other aspects, features, and implementations, and combinations of them may be expressed as apparatus, methods, methods of doing business, means or steps for performing functions, components, systems, program products, and in other ways.

Other aspects, features, and advantages will be apparent from the description and drawings, and from the claims.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
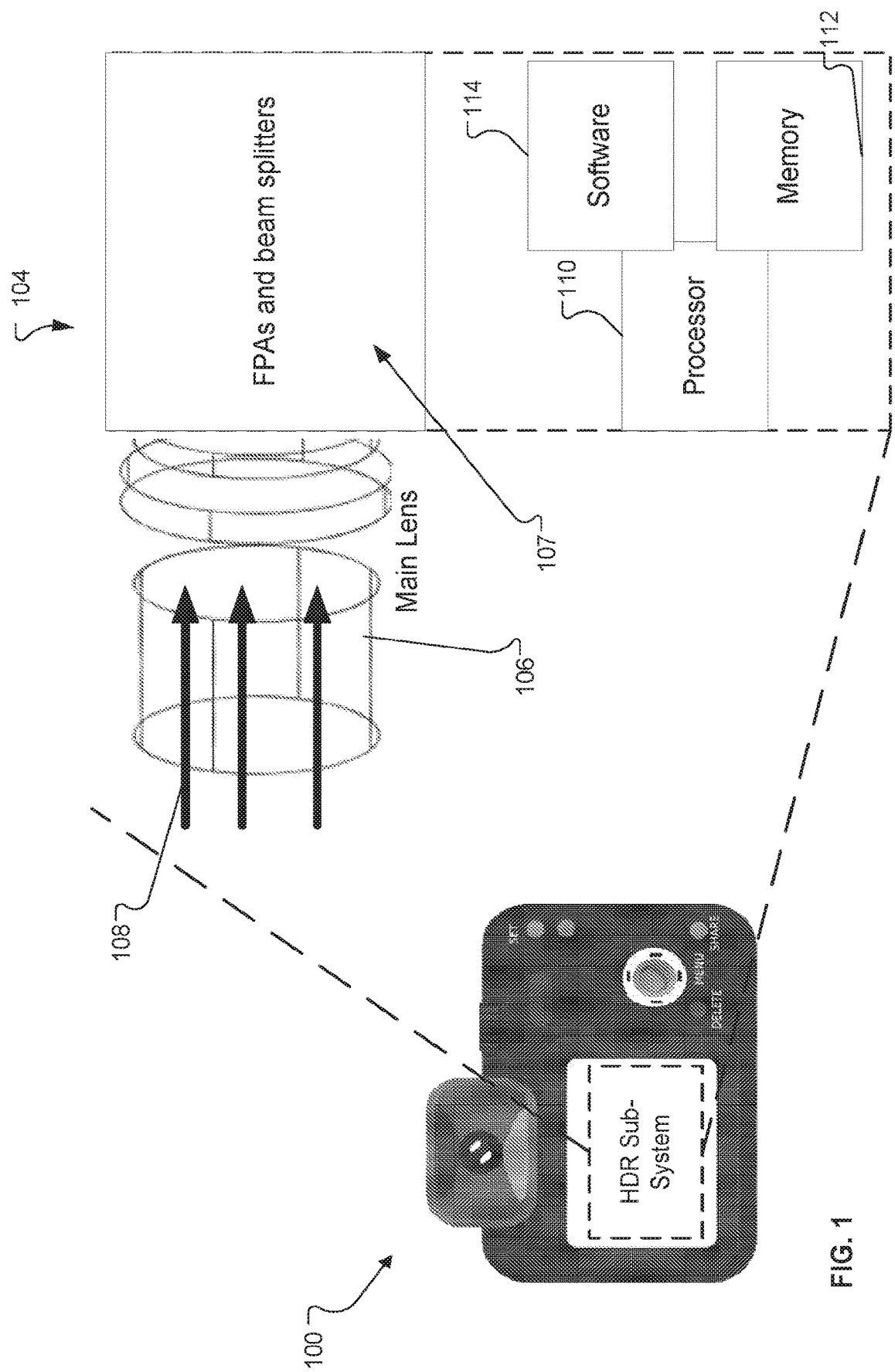
FIG. 1 is a schematic illustrating an exemplary HDR optical system.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

The invention relates to correcting deviations in detected color in an optical system with two or more sensors where the deviations are, at least in part, caused by sensor to sensor variation. The sensors (e.g., CCD sensors, CMOS sensors, focal plane arrays, or other light detection sensors) include an array of light detection elements (e.g., pixels). The invention teaches matching color detection values across multiple sensors and eventually color correcting the color values without prematurely (e.g., before color correction) losing saturated data indicators from the multiple sensors.

An exemplary process utilizing the invention to create an HDR image from sensor data from two CFA sensors by converting the data from a first sensor from its CCS to another sensor's CCS includes:

1) a first sensor (called the SE sensor) that receives a small portion of the incoming light and a second sensor (called the ME sensor) that receives a larger portion of the incoming light. For example, with a 90:10 beamsplitter between the two sensors, the ME sensor might receive approximately nine times as much light as the SE sensor.
2) a color card, to calculate the CCM for converting the SE sensor's image to truth. This CCM is called [C] below;
3) a color card to measure the CCM for converting the ME sensor's image to truth. This CCM is called [B] below. Note that because the ME sensor receives more light than the SE sensor, the ME sensor will probably require less light on the color card than was used with the SE sensor, in order to be well-lit. That is why there are often two stages to the CCM calculation;
4) an algorithm to demosaic the SE image data;
5) a processor to multiply SE image pixel data by the product of the two matrices, [C] and $[B]^{-1}$ shown below; where the notation "$[B]^{-1}$" represents the inverse of matrix [B];
6) the demosaic process is then reversed (that is, mosaic the image into a Bayer-patterned image). This yields a non-demosaiced SE image, whose colors have been converted to the ME sensor's CCS, which image is called the "SE (in ME CCS)" image; and
7) a processor to merge the newly-formed, Bayer-patterned "SE (in ME CCS)" image with the ME image (which is still in its raw, Bayer-patterned state).

This merged, Bayer-patterned image may now be demosaiced, and then color corrected by simply multiplying its pixels by the [B] matrix.

Although the example above shows how to combine two sensors' data, steps 4 through 7 may be repeated as many times as necessary to accommodate combining images from any number of sensors.

Another exemplary process utilizing the invention to create an HDR image from sensor data from two CFA sensors by converting the data from a first sensor from its CCS to another sensors CCS includes utilizing a color correction lookup table (LUT). In particular, step 5 above may be replaced with the following steps:

5a) a processor to transform the SE image pixel data into true colors in the real world (so-called "truth" or "true" color values) by performing a lookup of an SE sensor's color correction LUT.

5b) using the true colors, the processor further performing a reverse lookup of an ME sensor's color correction LUT to produce a demosaiced SE image, whose colors have been converted to the ME sensor's CCS. Alternatively, using the true colors, the processor performs a lookup in a color matching LUT (i.e., an inverted ME sensor color correction LUT) to produce the demosaiced image.

The SE image is then merged according to steps 6-7 above. This merged, Bayer-patterned image may now be demosaiced, and then color corrected by using the ME sensor's color correction LUT.

Advantageously, the LUT process reduces processing resources as required by the CCM approach.

FIG. 1 shows an HDR optical system 100, including an HDR sub-system 104. When light 108 enters a main lens 106 of the HDR optical system 100, the light 108 is detected by the sensor and beam splitter components 107. The HDR optical system 100 can also include a processor 110 and software 114 for collecting and analyzing data detected by the sensor and beam splitter components 107 and a memory 112 for storing (long-term or temporary) information.

Figure 2:
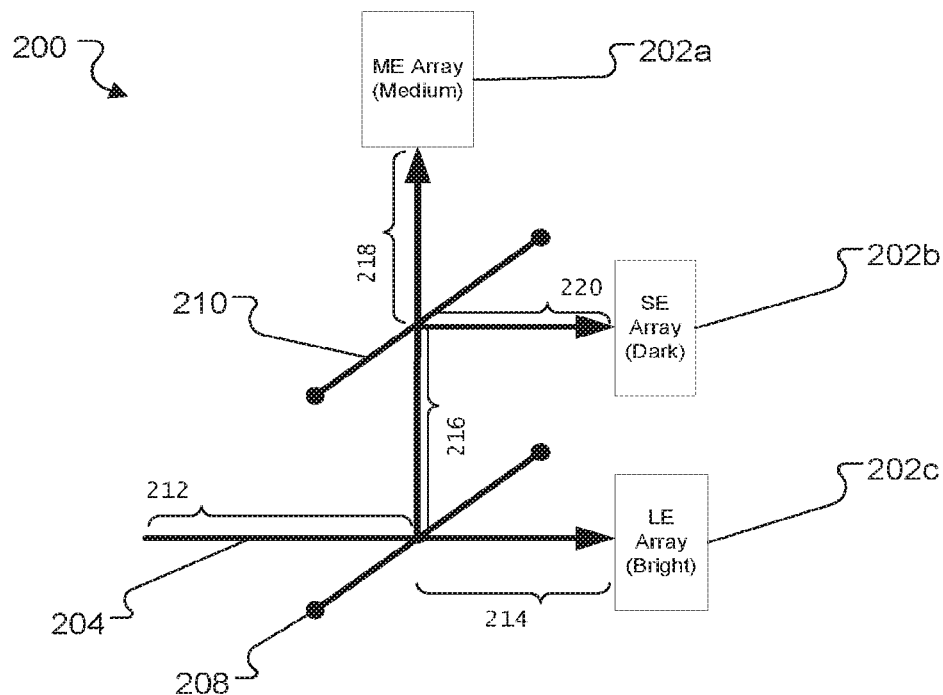
FIG. 2 is a schematic of an exemplary arrangement of three sensors and two pellicles for use with the system shown in FIG. 1.

Referring to FIGS. 1 and 2, the sensors and beam splitter components 107 can be arranged in pellicle configuration 200 including three sensors 202*a-c*. In this example, each of the sensors 202*a-c* is exposed to light for substantially the same period. The sensor 202*c* is sometimes referred to as a large exposure (LE) sensor because it is positioned where it will receive the greatest amount of illumination. The sensor 202*b* is sometimes referred to as a small exposure (SE) sensor because it is positioned where it will receive the least light amongst the sensors. The sensor 202*a* is sometimes referred to as the medium exposure (ME) sensor because it will receive light between the brightest light and the darkest light received amongst the sensors.

In this example, the light 108 travels in directions generally indicated by an arrow 204. For example, the light travels unhindered for a first distance 212 before reaching a first pellicle 208. Upon reaching the first pellicle 208, a portion of the light transmits through the first pellicle 208 and a portion is reflected away from the first pellicle 208. The transmitted light continues over a path 214 before reaching the LE sensor 202C. The reflected light continues over a path 216 before reaching a second pellicle 210. Upon reaching the second pellicle 210, a portion of the light transmits through the second pellicle 210 and a portion is reflected away from the second pellicle 210. The transmitted light travels along a path 218 before reaching the ME sensor 202*a*. The reflected light travels along a path 220 before reaching the SE sensor 202*b*.

Figure 3:
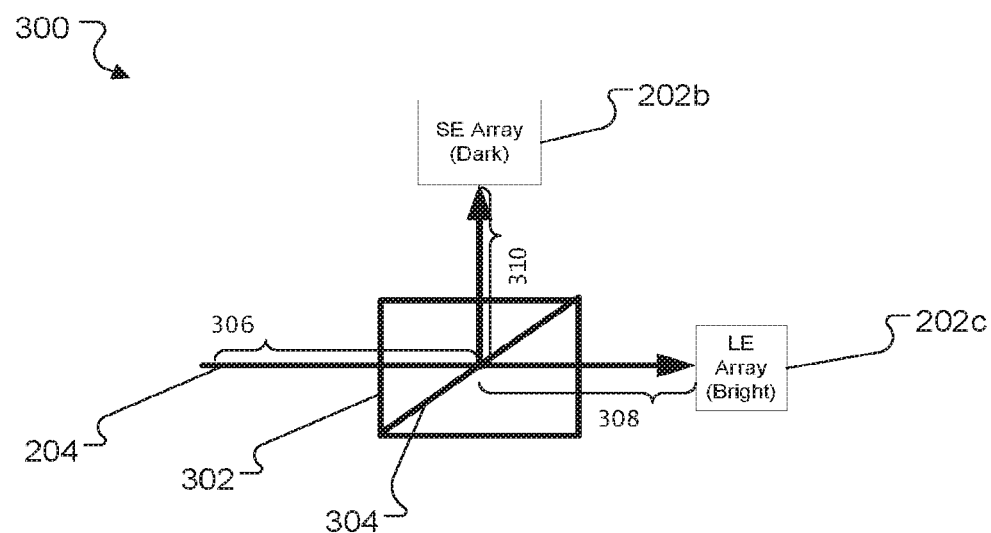
FIG. 3 is a schematic of an exemplary arrangement of two sensors and a cube for use with the system shown in FIG. 1.

Referring to FIGS. 1 and 3, the sensors and beam splitter components 107 can be arranged in a cube configuration 300. Like the pellicle configuration 200, in the cube configuration 300, each of the sensors 202*b-c* experience substantially the same amount of light exposure time. In this example, the light 108 travels along a first optical path 306 through part of a prism 302 before reaching a partially-reflective coating 304. Upon reaching the partially-reflective coating 304, a portion of the light transmits through the partially-reflective coating 304, and a portion of the light 108 is reflected away from by the partially-reflective coating 304. The transmitted light continues along an optical path 308 before reaching the LE sensor 202*c*, and the reflected light continues along an optical path 310 before reaching the SE sensor 202*b*. Other sensor and beam splitter configurations can also be used such as those disclosed in U.S. Pat. Nos. 8,320,047, 8,441,732, and 8,619,368, the contents which are each incorporated by reference in their entirety.

Figure 4:
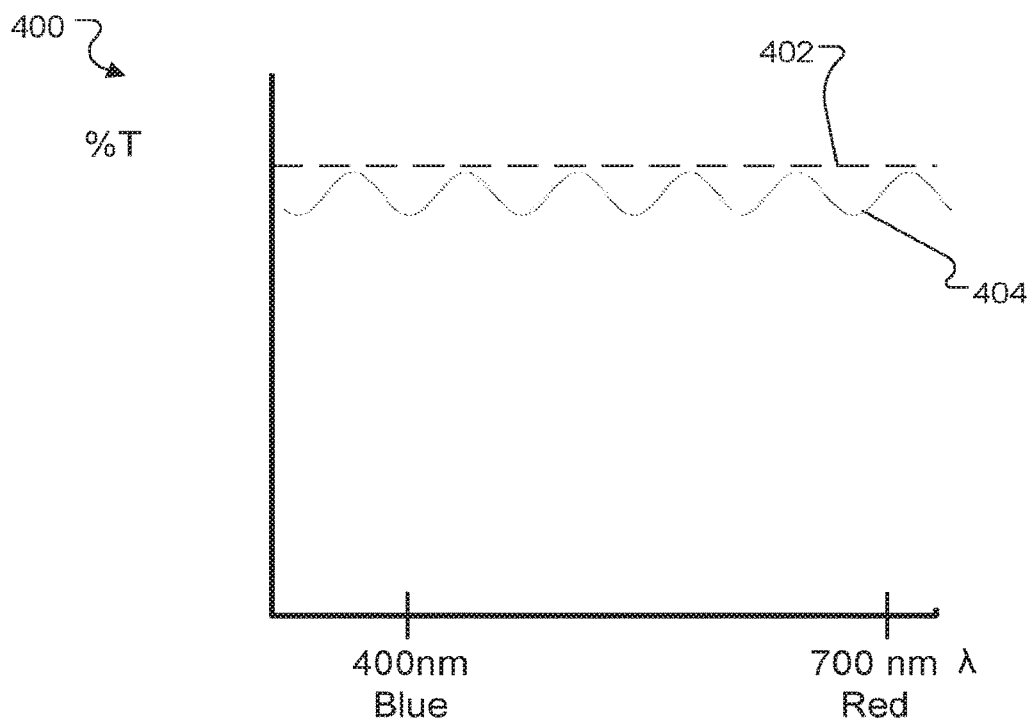
FIG. 4 is a graph illustrating the transmittance of light through a beam splitting object.
Figure 5:
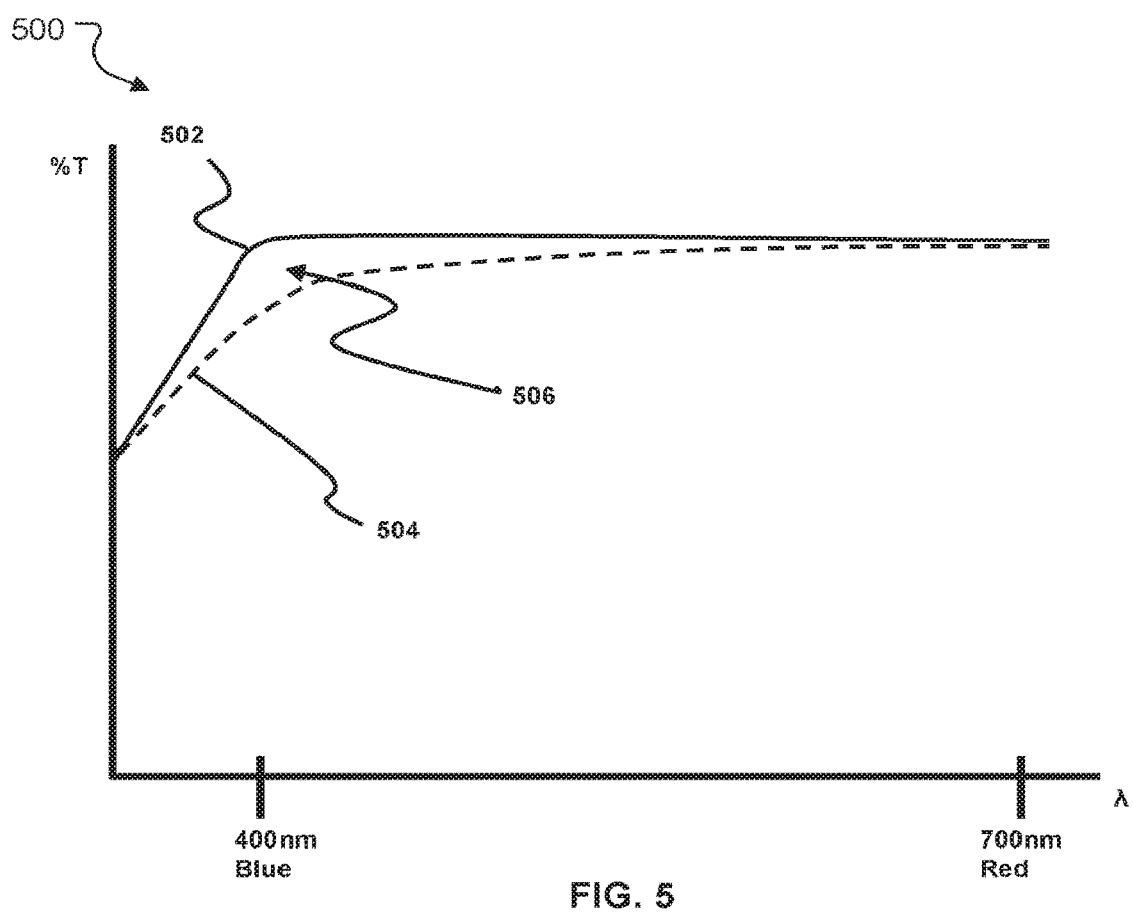
FIG. 5 is a graph illustrating the variation in color detection between two sensors within a system.

As shown in FIGS. 4 and 5, a beam splitting object (e.g., the pellicle, cube, or a reflective coating), will affect the detected properties of light. For example, FIG. 4 shows a graph 400 illustrating how the transmittance percent of light within the beam splitting object behaves. The light does not travel unperturbed through the object, the unperturbed path being indicated by a dashed line 402. Instead the transmittance percent, for example, will oscillate as a function of light wavelength (or color) within the coating as shown by line 404. This oscillation can produce discrepancies between color values detected by different sensors based on where the information is detected in the oscillation. In addition, as shown in FIG. 5, a first sensor may detect color values which indicate a transmittance percentage represented by a line 502. However, due to the non-direct path within the beamsplitters or due to losses caused by multiple beamsplitters on the optical path, a second sensor may detect color values that indicate a transmittance percentage represented by a line 504. For images or videos displayed at lower dynamic ranges, the differences 506 between the line 502 and the line 504 may be inconsequential. However, in HDR image and video capture, these discrepancies can produce an image with noticeable color errors. Color matching between the various sensors can help to address this issue.

Figure 6:
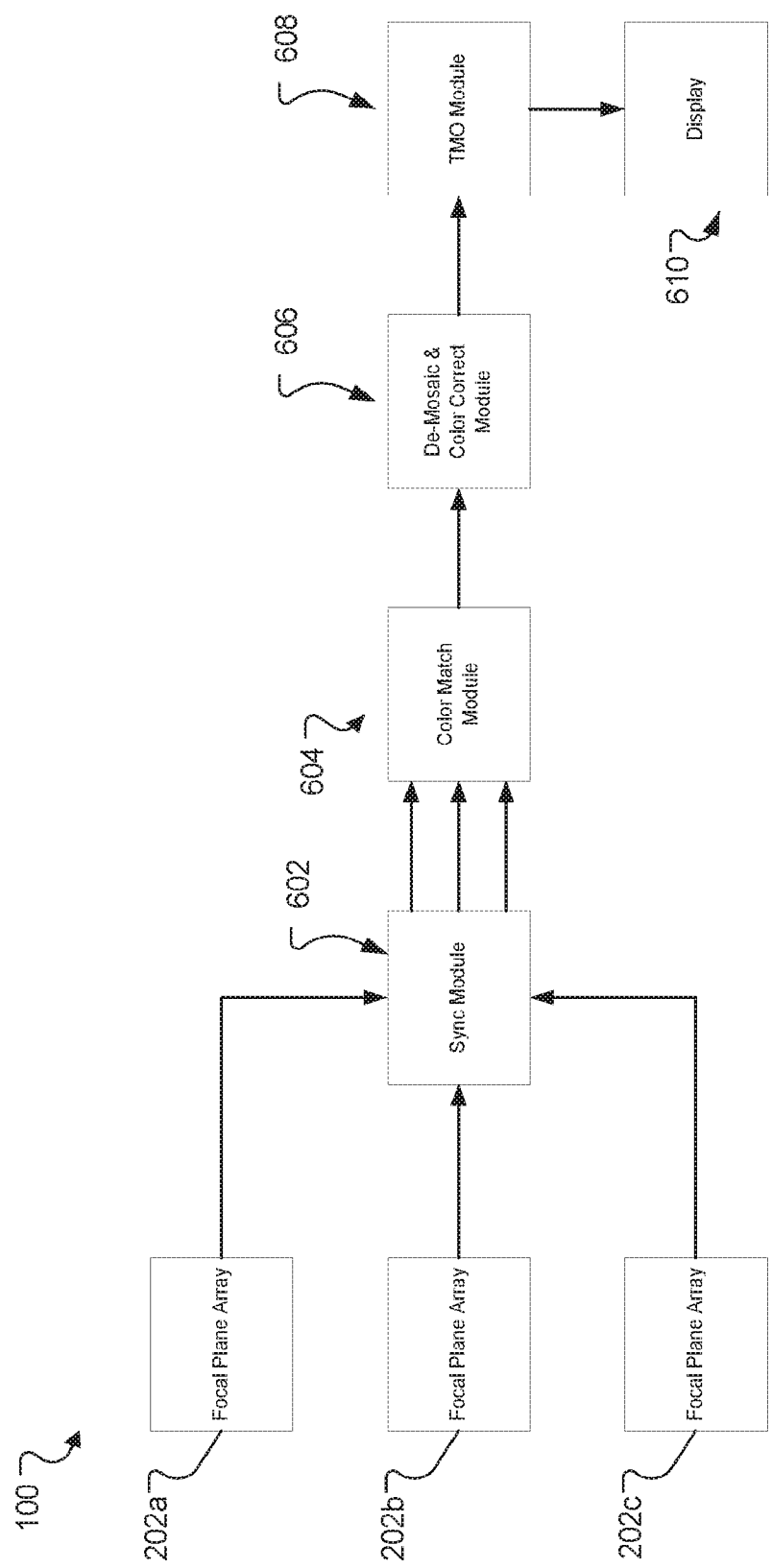
FIG. 6 is a flow chart showing the flow of information through the system shown in FIG. 1.
Figure 7:
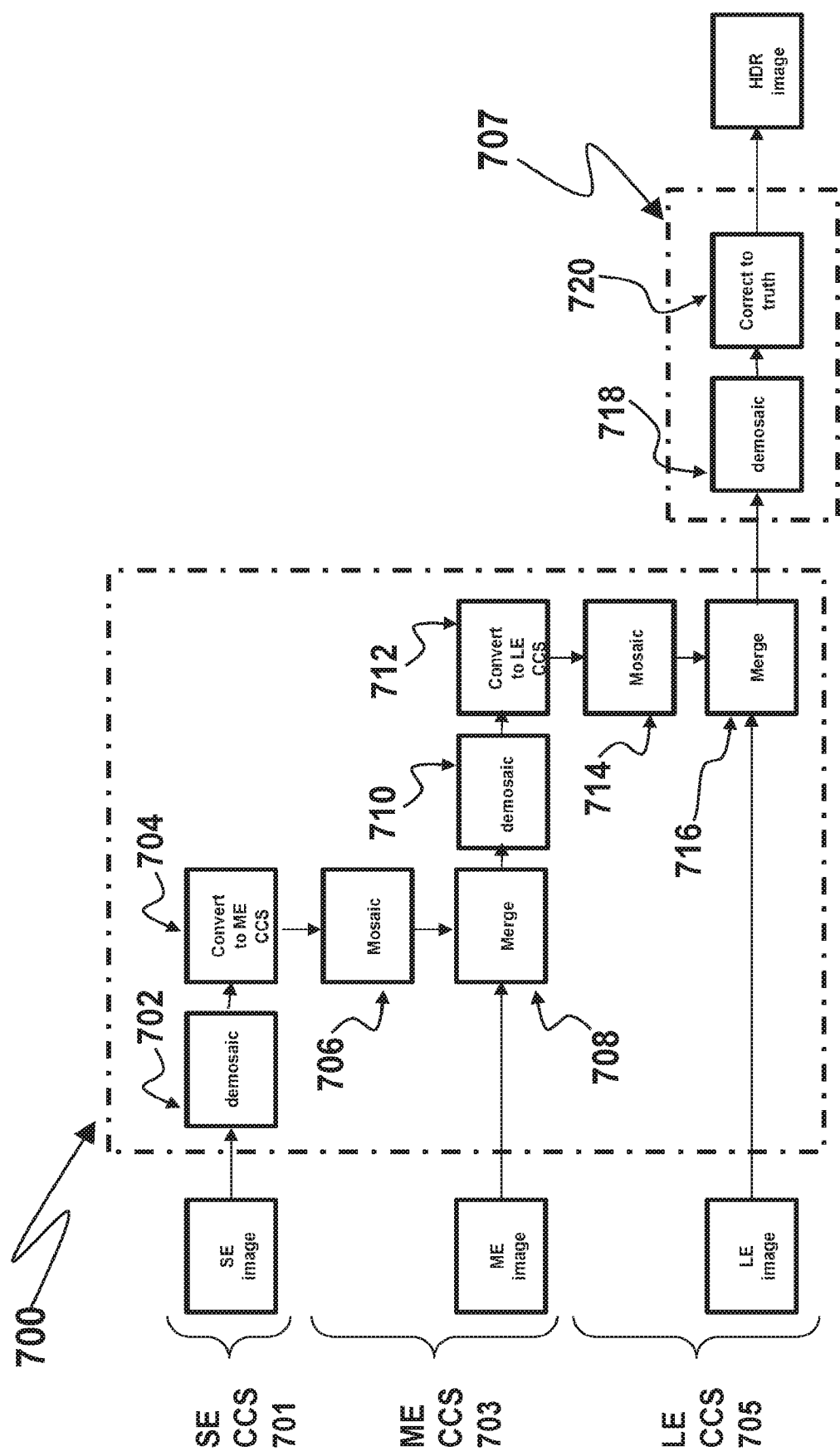
FIG. 7 is a flow chart of an exemplary color matching process.

Referring to FIG. 6, the flow of information in an HDR optical system 100 is shown. In this example, information (e.g., values from one or more pixels indicative of a detected color intensity) from each of the sensors 202*a-c* is transmitted to a sync module 602 which synchronizes the pixel signals. The pixel signals are then sent to a color match module 604 that executes a color matching process 700 (as shown in FIG. 7). After completing the color matching process 700, the color values are transmitted to a color correction module 606 that executes a color correction process 707. The color corrected information can then optionally undergo additional processing by, for example, a tone mapping operator (TMO) module 605 before being transmitted to a display 608.

Referring to FIG. 7, the color matching process 700 for the HDR optical system 100 having the pellicle configuration 200 is shown. The purpose of the color matching process 700 is to merge images from multiple sensors together, in stages where two images are merged at a time, in a way that preserves color information from one sensor to the next. As an example, in FIG. 7, the darkest image is shown, from the SE sensor, being merged with the middle-brightness image, from the ME sensor. The result of this merger is then merged with the brightest image, from the LE sensor.

The basic principle guiding the color matching process 700 is to first convert a dark image to the color correction space of the next brightest image, and then to merge the two "non-demosaiced" (or Color Filter Array [CFA] Bayer-patterned) images together.

The color matching process 700 for the pellicle configuration 200, which has 3 sensor arrays 202*a-c*, comprises three general phases: an SE color correction space (CCS) phase 701, ME CCS phase 703, and LE CCS phase 705. The color matching process first begins with the SE CCS phase 701, which comprises first demosaicing 702 the CFA Bayer-patterned image produced by the SE sensor 202*b*, and then matching (or converting) 704 the CCS of this SE image to the CCS of the ME image. The demosaicing process 702 yields a full-color value to each pixel in the image.

After it has been demosaiced 702, the SE image data is next matched into the ME CCS 703. The purpose of this conversion step 704 is to match the color of the SE array image to the color of the ME array (with all of the ME array's color imperfections).

In one example, to perform this conversion 704, the pixel input signals are transformed through a color correction matrix. For example, Equations 1-3 show the color correction matrices for the LE, ME, and SE sensors, respectively. The color correction matrix for the LE sensor is calculated using Equation 1, where the 3×3 matrix coefficients, including values $A_1$-$A_9$, represent coefficients selected to strengthen or weaken the pixel value, and an RGB matrix ($R_{LE}$, $G_{LE}$, and $B_{LE}$) represents the demosaiced RGB output signal from the LE sensor. In some cases, the 3×3 matrix coefficients can be derived by comparing the demosaiced output against expected (or so-called "truth") values. For example, the 3×3 matrix coefficients can be derived by least-squares polynomial modeling between the demosaiced RGB output values and reference values from a reference color chart (e.g., a Macbeth Chart). Similarly, the color correction matrix for the ME sensor is calculated using Equation 2, where the RGB matrix ($R_{ME}$, $G_{ME}$, and $B_{ME}$) represents the demosaiced RGB output signal from the ME sensor, and the color correction matrix for the SE sensor is calculated using Equation 3, where the RGB matrix ($R_{ME}$, $G_{ME}$, and $B_{ME}$) represents the demosaiced RGB output values from the SE sensor.

$$\text{correcting } SE \text{ pixel values using } [A], \quad \text{Equation 1}$$
$$\text{the Color Correction Matrix for the } LE \text{ sensor}$$

$$\begin{bmatrix} A_1 & A_2 & A_3 \\ A_4 & A_5 & A_6 \\ A_7 & A_8 & A_9 \end{bmatrix} \begin{bmatrix} R_{LE} \\ G_{LE} \\ B_{LE} \end{bmatrix} = [A] \begin{bmatrix} R_{LE} \\ G_{LE} \\ B_{LE} \end{bmatrix} \begin{bmatrix} R_{truth} \\ G_{truth} \\ B_{truth} \end{bmatrix}$$

$$\text{correcting } ME \text{ pixel values using } [B], \quad \text{Equation 2}$$
$$\text{the Color Correction Matrix for the } ME \text{ sensor}$$

$$\begin{bmatrix} B_1 & B_2 & B_3 \\ B_4 & B_5 & B_6 \\ B_7 & B_8 & B_9 \end{bmatrix} \begin{bmatrix} R_{ME} \\ G_{ME} \\ B_{ME} \end{bmatrix} = [B] \begin{bmatrix} R_{ME} \\ G_{ME} \\ B_{ME} \end{bmatrix} \begin{bmatrix} R_{truth} \\ G_{truth} \\ B_{truth} \end{bmatrix}$$

$$\text{correcting } SE \text{ pixel values using } [C], \quad \text{Equation 3}$$
$$\text{the Color Correction Matrix for the } SE \text{ sensor}$$

$$\begin{bmatrix} C_1 & C_2 & C_3 \\ C_4 & C_5 & C_6 \\ C_7 & C_8 & C_9 \end{bmatrix} \begin{bmatrix} R_{SE} \\ G_{SE} \\ B_{SE} \end{bmatrix} = [C] \begin{bmatrix} R_{SE} \\ G_{SE} \\ B_{SE} \end{bmatrix} \begin{bmatrix} R_{truth} \\ G_{truth} \\ B_{truth} \end{bmatrix}$$

To convert an image from a first color correction space (CCS) to a second CCS, the color correction matrices from one or more sensors can be used. This process may be referred to as converting between CCSs or calibrating CCSs. Neither the first CCS nor the 10 second CCS accurately reflects the true color of the captured image—both the first and the second CCS both have color inaccuracies, and these inaccuracies are, in general, different from one another. The fact that each sensor requires a unique CM multiplication in order to correct its color to "truth" bears out this fact. The present invention provides a method for taking the image from a first sensor and (1) removing its color inaccuracies, and then (2) introducing the color inaccuracies from the second sensor.

The two-step process 704 for converting an image from the SE sensor's CCS to the ME sensor's CCS is illustrated in Equation 4 below:

$$\text{converting } SE \text{ pixel values from } SE\ CCS \text{ to } ME\ CCS \quad \text{Equation 4}$$

$$\begin{bmatrix} R_{SE} \\ G_{SE} \\ B_{SE} \end{bmatrix} [C][B]^{-1} = \begin{bmatrix} R_{ME} \\ G_{ME} \\ B_{ME} \end{bmatrix}$$

In Equation 4, the SE sensor's pixel values (R, G, B) are multiplied by the SE sensor's Correction Matrix, [C], and then multiplied by the inverse of the ME sensor's Correction Matrix, [B]. The result is a set of pixel values (R, G, B) that are in the ME sensor's CCS.

In another example, to perform this conversion 704, the pixel input signals are transformed using a color correction lookup table (LUT). For example, the color correction matrices of Equations 1-3 can be used to create lookup tables for the LE, ME, and SE sensors, respectively. For instance, the color correction LUT for the LE sensor can be generated by multiplying all possible input RGB LE signals by the CCM of Equation 1. Accordingly, the LUT for the LE sensor maps all possible input RGB LE values to corresponding true color values. Similarly, the color correction LUT for the ME sensor is generated by multiplying all possible input RGB ME signals by the CCM of Equation 2. Additionally, the color correction LUT for the SE sensor is generated by multiplying all possible input RGB SE signals by the CCM of Equation 3. Each of the LUTs can be stored in memory (e.g., the memory 820 of FIG. 8) or a mass storage device (e.g., the storage device 830 of FIG. 8). In some embodiments, each of the LUTs can be combined into a single color correction LUT.

The process 704 for converting an image from the SE sensor's CCS to the ME sensor's CCS is as follows. The SE sensor's pixel values (R, G, B) are used to perform a lookup using the SE sensor's lookup table. The SE sensor's lookup table outputs corresponding true (R, G, B) color values. The true (R, G, B) color values of the SE sensor are then used to obtain colors in the ME sensor's CCS. This is accomplished by using the true (R, G, B) color values to perform a lookup using the ME sensor's lookup table. In one aspect, the ME sensor's lookup table can be a reverse LUT generated from the color correction LUT for the ME sensor by, for example, performing an inversion of the ME sensor's color correction LUT. Alternatively, a reverse lookup can be performed on the ME sensor's color correction LUT. This process yields a set of pixel values (R, G, B) that are in the ME sensor's CCS.

Methods of the invention allow matching of the CCS of the second sensor to the CCS of the first sensor so that the images from the two sensors may be accurately combined, or merged. The method for applying all the inaccuracies of the second CCS to the first CCS, prior to combining images from the two into an HDR image, is previously unknown. Typical methods for combining data from multiple CFA sensors rely on color-correcting each sensor's data to the "truth" values measured from a calibrated color card, prior to combining the images. This is problematic in an HDR system, where it is known that the brighter sensor's image will have significant portions that are saturated, which saturated portions should actually have been taken from the darker sensor's image when combining. Color correcting an image that has saturated pixels will cause colors to be miss-identified. Therefore, in an HDR system, combining images that have been individually color-corrected to "truth" values will almost always lead to colors being miss-identified.

The solution provided in the present invention avoids this color misidentification problem by performing the steps of [(a) demosaic, (b) color match & (c) mosaic] only on data that comes from the darker sensor, thereby ensuring all data is accurately returned to its non-demosaiced state prior to the step of merging the darker sensor's data with the brighter sensor's data.

Furthermore, prior to merging the images from two sensors, the present invention matches the Color Correction Spaces of the two sensors. This transformation is ensures that the two images (from the first and second CCS sensors) can be accurately merged, pixel-for-pixel, in non-demosaiced format. It may at first seem counterintuitive to change the CCS of one sensor to match the CCS of a second sensor, especially when the second sensor's CCS is known to differ from the "true" CCS. However, it is an important step in ensuring the color data from both sensors is matched together, prior to merging the images.

After the SE information is transformed from the SE CCS 701 to the ME CCS 703, the transformed values are mosaiced 706 (i.e., the demosaicing process is reversed). The transformed SECFA Bayer-patterned pixel values are now comparable with the CFA Bayer-patterned pixel values detected by the ME sensor, which supports a seamless merge 708 of ME and SE non-demosaiced sensor data.

The merged non-demosaiced image within the ME CCS 703 can now undergo a demosaicing process 710. This demosaicing process is similar to the demosaicing process 702 described above, except the CFA pixel values undergoing the demosaicing process are now associated with the ME CCS.

Still Referring to FIG. 7, to transform 712 the color values associated with the ME CCS, an ME color correction matrix can be determined using the demosaiced color values, as shown above in Equation 2. The color corrected ME information is transformed from the ME CCS 703 to the LE CCS 705 by multiplying the ME color correction matrix by the inverse of the LE color correction matrix, as shown in Equation 4.

Alternatively, to transform 712 the color values associated with the ME CCS, the color values are converted into true colors from the ME CCS by performing a lookup in the ME sensor's color correction LUT. The true (R, G, B) color values produced by the ME sensor's LUT are then used to obtain colors in the LE sensor's CCS. This is accomplished by using the true (R, G, B) color values produced by the ME sensor's LUT to perform a lookup using the LE sensor's color correction lookup table. In one aspect, the LE sensor's lookup table can be a reverse LUT generated from the LE sensor's color correction LUT. Alternatively, a reverse lookup can be performed on the LE sensor's color correction LUT. This process yields a set of pixel values (R, G, B) that are in the LE sensor's CCS.

After the ME information is transformed from the ME CCS 703 to the LE CCS 705, the transformed values are mosaiced 714 (i.e., the demosaicing process is reversed). This allows the transformed ME CFA Bayer-patterned pixel values to merge 716 with the CFA Bayer-patterned pixel values detected by the LE sensor. At this point in the color matching process 700, the transformed color information detected by the SE and ME sensors is now calibrated to match the color information detected by the LE sensor. This newly merged color value data set now represents color values within the LE color correction space 705.

Still referring to FIG. 7, after the color matching process 700 is complete, the color values detected by the various sensors are now comparable with each other. However, as discussed above, these color values still include color inaccuracies, specifically these color values are in the LE CCS, and therefore require correction using the LE sensor CM, called [A]. Alternatively, correction can be performed by using the LE sensor's LUT. These color inaccuracies would produce an image which does not match the color of the captured object. To color correct for these inaccuracies (also referred to as correcting to truth), a color correcting process 707 can be used. In the color correcting process 707, the color values associated with the LE color correction space (both transformed and detected) undergo a demosaicing process 718, which is generally similar to the demosaicing processes 702, 710 of the color matching process 700. To correct for any color value inaccuracies, the LE color correction matrix (as defined by Equation 1) can be multiplied by the LE pixel values ([LE]) to correct the LE color values to accurately reflect the color values of the original captured image, as shown in Equation 4. Alternatively, correction can be performed by using the LE sensor's LUT. This yields an image with color information that not only excludes inaccuracies introduced by the multiple sensors but also matches the color information of "truth". A final image can then be generated, and/or displayed, and the final image includes color levels representative of the captured object.

The ME CCS process 703, which comprises the steps of conversion of SE information to ME CCS 704, mosaic 706, merge 708, and demosaic 710, may be optionally removed or performed additionally, in order to accommodate any number of multiple sensors. For example, for a system comprising two sensors in a cube configuration 300, the ME CCS process 703 may be omitted from the color matching process 700, so that the color matching process 700 comprises the SE CS 701 and LE CCS 705 steps, corresponding to the SE sensor array 202*b* and LE sensor array 202*c* of the cube configuration 300.

Figure 8:
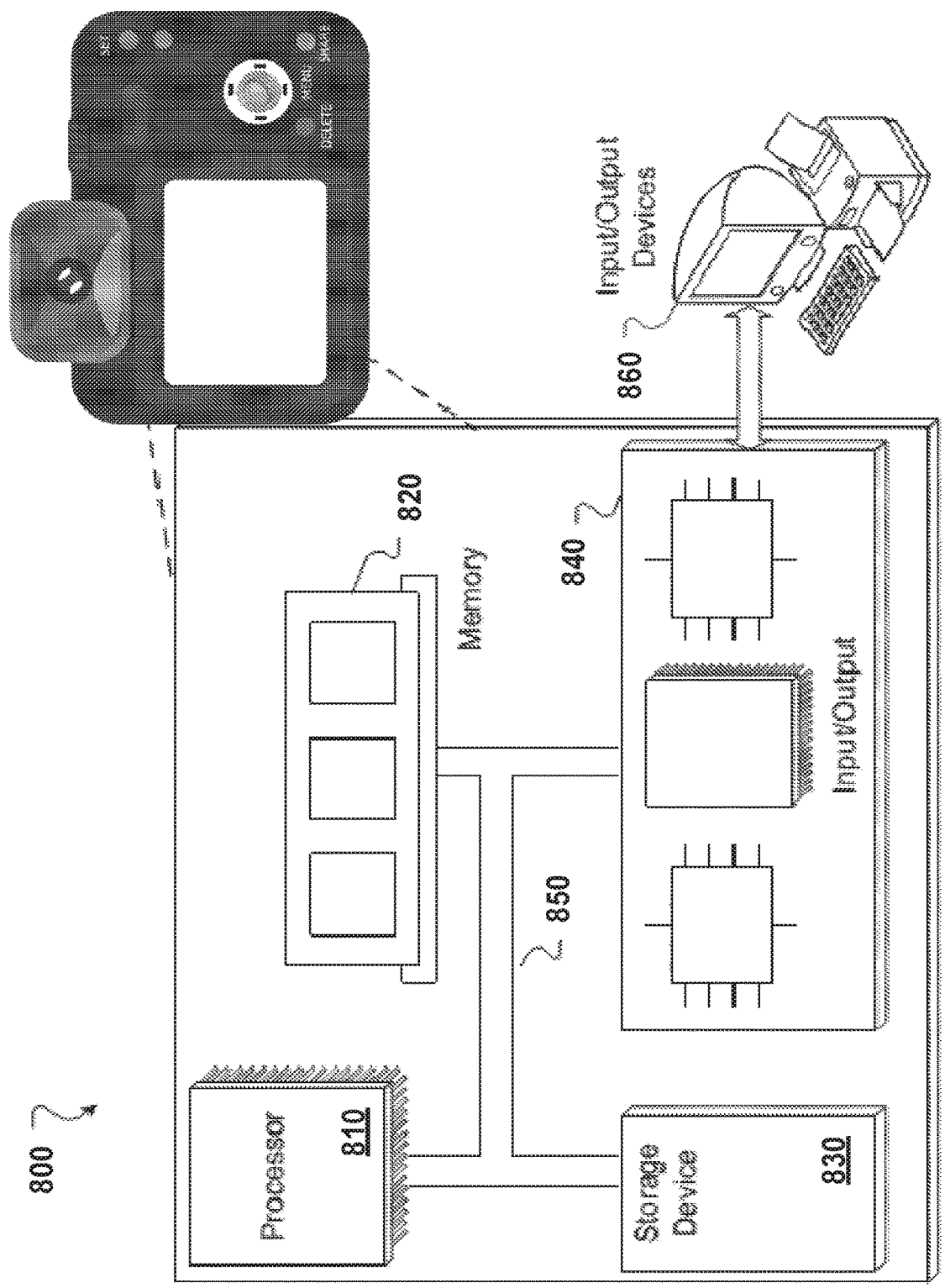
FIG. 8 is a block diagram of a computing system for use with the system shown in FIG. 1.

FIG. 8 is a block diagram of an exemplary computer system 800. For example, referring to FIG. 1, the HDR sub-system 104 can include the system 800. The system 800 includes a processor 810, a memory 820, a storage device 830, and an input/output device 940. Each of the components 810, 920, 930, and 940 can be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a quantum computer. In some implementations, the processor 810 is a Field Programmable Gate Array (FPGA). In some implementations, the processor 810 is an Application Specific Integrated Circuit (ASIC). The processor 810 is capable of processing instructions stored in the memory 820 or on the storage device 830. The processor 810 may execute operations such as the color matching or color correcting operations described herein.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a computer-readable medium. In some implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed on a network and accessed using a network. The input/output device 940 provides input/output operations for the system 800. In some implementations, the input/output device 940 can include one or more of a network interface devices, e.g., an Ethernet card, a serial communication device, e.g., an RS-232 port, and/or a wireless interface device, e.g., an 802.9 card, a 3G wireless modem, a 4G wireless modem, or a carrier pigeon interface. In some implementations, the input/output device can include driver devices configured to receive input data and send output data to other input/output devices, e.g., keyboard, printer and display devices 860. In some implementations, mobile computing devices, mobile communication devices, and other devices can be used.

While certain implementations have been described above, other implementations are possible. For example, while the color matching process has generally been described as progressing from an SE CCS to an ME CCS to an LE CCS, other sequences are possible. For example, the progression can be reversed, the progression may proceed directly from the SE CCS to the LE CCS, or may proceed in any order through two or more correction spaces.

While the color matching process has generally been described as using three sensors (e.g., as shown in FIG. 7), the color matching process may also be used with only two sensors or with more than three sensors. In these cases, the general methodology of the three sensors embodiment can be expanded or reduced to accommodate the desired sensor configuration so long as the pixels from desired sensors remain at least partially aligned physically.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, firmware, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment or for implementation in a Field Programmable Gate Array (FPGA) or compiled firmware embedded in an Application Specific Integrated Circuit (ASIC). A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto-optical disks; CD-ROM and DVD-ROM disks; or any other type of non-transitory storage medium suitable for storing electronic instructions, and each coupled to a computer system bus. The processor and the memory can be supplemented by, or incorporated in, special purpose logic circuitry. The components of the system can be interconnected by any form or medium of digital data communication, e.g., a communication network. Examples of communication networks include a LAN and a WAN.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification, and guidance that can be adapted to the practice of this invention in its various embodiments and equivalents thereof.

What is claimed is:

1. A method for generating a true color, high dynamic range (HDR) image, the method comprising:
splitting, using a beamsplitter in an optical system, an image forming beam into a first portion and a second portion;
capturing a first image from the first portion using a first sensor;
capturing a second image from the second portion using a second sensor;
introducing, using a processor in the optical system, imperfections associated with the second sensor into the first image to give a transformed first image;
combining the transformed first image with the second image to form an HDR image; and
removing the imperfections associated with the second sensor from the HDR image to thereby transform the HDR image into a true color HDR image.

2. The method of claim 1, wherein the beamsplitter splits the beam asymmetrically such that the first portion is darker than the second portion and such that the first image is a dark version of the second image.

3. The method of claim 1, wherein the beamsplitter comprises a 90:10 beamsplitter such that the second sensor receives approximately nine times as much light as the first sensor.

4. The method of claim 1, wherein combining the transformed image with the second image to form the HDR image comprises:
identifying one or more saturated pixel values in the second image; and
replacing the saturated pixel values with replacement values determined by interpolating across corresponding pixels of the transformed image.

5. The method of claim 1, wherein the processor is operable to
remove imperfections associated with the first sensor from the first image by pre-multiplying first RGB values with a matrix [C];
remove the imperfections associated with the second sensor from the second image by pre-multiplying second RGB values with a matrix [B].

6. The method of claim 5, wherein the processor introduces the imperfections associated with the second sensor into the first image by pre-multiplying the first RGB values with [B]−1.

7. The method of claim 6, further wherein, when the first RGB values are represented as the vector [R1] the processor introduces the imperfections by performing [C][B]−1[R1].

8. The method of claim 6, wherein the processor represents RGB values in the HDR image as a vector [R'] and transforms the HDR image into the true color HDR image by performing [B][R'].

9. The method of claim 1, wherein the processor removes imperfections associated with the first sensor and transforms the HDR image into the true color HDR image through the use of one or more look-up tables.

10. The method of claim 1, wherein the processor is a field-programmable gate array or an application-specific integrated circuit.

11. The method of claim 1, wherein the beamsplitter splits the beam asymmetrically such that the second portion is darker than the first portion and such that the second image is a dark version of the first image.

\* \* \* \* \*